(12) United States Patent
Kinnen et al.

(10) Patent No.: US 9,273,658 B2
(45) Date of Patent: Mar. 1, 2016

(54) HANDHELD WORK APPARATUS AND SUCTION HEAD FOR CONNECTION TO A FUEL LINE IN A HANDHELD WORK APPARATUS

(71) Applicant: Andreas Stihl AG & Co. KG, Waiblingen (DE)

(72) Inventors: Arno Kinnen, Fellbach (DE); Christopher Tost, Affalterbach (DE); Wolfgang Layher, Besigheim (DE); Michael Dietenberger, Waiblingen (DE); Felix Mayer, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 664 days.

(21) Appl. No.: 13/684,404

(22) Filed: Nov. 23, 2012

(65) Prior Publication Data

US 2013/0133620 A1   May 30, 2013

(30) Foreign Application Priority Data

Nov. 25, 2011   (DE) .......................... 10 2011 119 464

(51) Int. Cl.

| F02M 69/52 | (2006.01) |
|---|---|
| B01D 35/00 | (2006.01) |
| B01D 35/06 | (2006.01) |
| F02M 37/22 | (2006.01) |
| F02M 27/04 | (2006.01) |
| F02B 63/02 | (2006.01) |

(52) U.S. Cl.
CPC .............. *F02M 69/52* (2013.01); *B01D 35/06* (2013.01); *F02M 27/045* (2013.01); *F02M 37/22* (2013.01); *F02B 63/02* (2013.01)

(58) Field of Classification Search
CPC ... F02M 37/007; F02M 37/22; F02M 27/045; F02M 2037/228; F02M 69/52; F02B 63/02; B60K 15/007; B60K 2015/03236; B01D 35/005; B01D 35/06; B03C 2201/18
USPC ........ 220/172.3, 172.4, 222, 223, 416.4, 460; 210/172.3, 172.4, 222, 223, 416.4, 460
See application file for complete search history.

(56) References Cited

U.S. PATENT DOCUMENTS

| 2,678,728 | A | * | 5/1954 | Spodig | .......................... 210/223 |
| 2,690,842 | A | * | 10/1954 | Spluvak | .......................... 210/94 |
| 2,788,125 | A | * | 4/1957 | Webb | .......................... 210/172.4 |
| 2,810,482 | A | * | 10/1957 | Kasten | .......................... 210/460 |
| 2,905,327 | A | * | 9/1959 | Phillips | ................ B01D 35/027 |
| | | | | | 210/449 |
| 2,980,257 | A | * | 4/1961 | Paton | ........................... 210/223 |
| 3,061,104 | A | * | 10/1962 | Schaffner | ................... 210/172.3 |

(Continued)

FOREIGN PATENT DOCUMENTS

| JP | 09271614 A | * | 10/1997 |
| WO | WO 9722395 A1 | * | 6/1997 |
| WO | WO 2006005083 A1 | * | 1/2006 |

*Primary Examiner* — Mahmoud Gimie
*Assistant Examiner* — John Zaleskas
(74) *Attorney, Agent, or Firm* — Walter Ottesen P.A.

(57) ABSTRACT

A handheld work apparatus includes a fuel tank, into which a flexible fuel line projects. A suction head is arranged at the free end of the fuel line. The suction head is connected via the fuel line to a fuel supply device of an internal combustion engine of the work apparatus. The suction head has at least one weight member. The weight member is formed at least partially as a magnet to achieve good cleaning of the fuel without a substantial increase in the weight of the work apparatus.

9 Claims, 4 Drawing Sheets

(56) References Cited

U.S. PATENT DOCUMENTS

| | | | |
|---|---|---|---|
| 3,171,806 A * | 3/1965 | Schaffner | 210/172.4 |
| 3,240,341 A * | 3/1966 | Rosaen | 210/222 |
| 3,744,640 A * | 7/1973 | Grover | 210/463 |
| 3,841,489 A * | 10/1974 | Combest et al. | 210/223 |
| 3,890,232 A * | 6/1975 | Combest et al. | 210/223 |
| 4,036,758 A * | 7/1977 | Combest | 210/223 |
| 4,204,960 A * | 5/1980 | Sugiyama et al. | 210/232 |
| 4,411,788 A * | 10/1983 | Kimura | 210/439 |
| 4,428,835 A * | 1/1984 | Nagashima | 210/172.4 |
| 4,561,977 A * | 12/1985 | Sasaki | 210/356 |
| 4,626,347 A * | 12/1986 | Neglio | 210/232 |
| 4,717,477 A * | 1/1988 | Nagashima | 210/314 |
| 4,763,632 A * | 8/1988 | Andreasson | B60K 15/06 123/510 |
| 4,851,118 A * | 7/1989 | Kurihara | 210/315 |
| RE33,103 E * | 10/1989 | Nagashima | 210/172.4 |
| 5,085,768 A * | 2/1992 | Murakami et al. | 210/222 |
| 5,273,193 A * | 12/1993 | Murakami et al. | 222/189.06 |
| 5,282,963 A * | 2/1994 | Hull et al. | 210/223 |
| 5,354,462 A * | 10/1994 | Perritt | 210/223 |
| 5,441,637 A * | 8/1995 | Gutjahr et al. | 210/232 |
| 5,556,540 A * | 9/1996 | Brunsting | 210/222 |
| 6,337,012 B1 * | 1/2002 | Devine | 210/223 |
| 6,440,305 B1 * | 8/2002 | Donnerdal et al. | 210/342 |
| 6,482,321 B1 * | 11/2002 | Bossler et al. | 210/315 |
| 6,576,128 B1 * | 6/2003 | Jackson | 210/223 |
| 7,806,107 B2 * | 10/2010 | Knauβ et al. | 123/468 |
| 8,132,557 B2 * | 3/2012 | Joos et al. | 123/509 |
| 2002/0195383 A1 * | 12/2002 | Caiozza | B01D 29/114 210/223 |

* cited by examiner

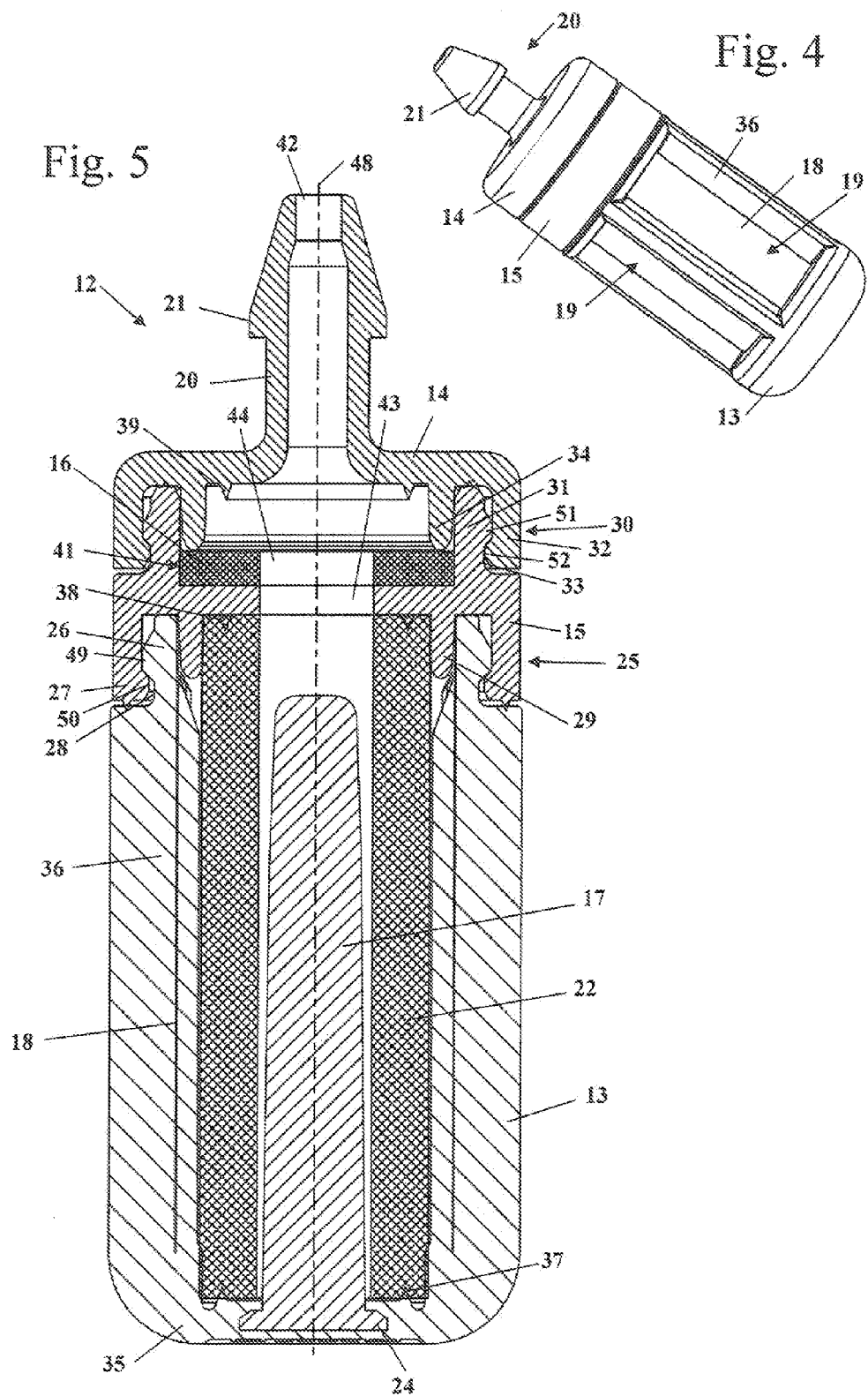

HANDHELD WORK APPARATUS AND SUCTION HEAD FOR CONNECTION TO A FUEL LINE IN A HANDHELD WORK APPARATUS

CROSS REFERENCE TO RELATED APPLICATION

This application claims priority of German patent application no. 10 2011 119 464.2, filed Nov. 25, 2011, the entire content of which is incorporated herein by reference.

FIELD OF THE INVENTION

The invention relates to a handheld work apparatus having a fuel tank in which a suction head is arranged and to a suction head for connection to a fuel line in a handheld work apparatus.

BACKGROUND OF THE INVENTION

A suction head for a fuel line in a handheld work apparatus is known front U.S. Pat. No. 6,482,321. To ensure that the suction head is immersed in the fuel in every operating position of the fuel tank, a weight member is provided in the housing of the suction head.

Contaminants may enter the fuel tank, especially during the filling of the fuel tank, it being possible for such contaminants also to contain metal shavings. These metal shavings can obstruct the fuel supply during operation, especially when the fuel is metered through an electromagnetic valve to which the metal shavings can adhere.

It is known to provide a magnet in fuel filters. Such a magnet is usually made of metal, and therefore has a comparatively high weight. However, in handheld work apparatuses, a high weight is undesirable.

SUMMARY OF THE INVENTION

It is an object of the invention to provide a handheld work apparatus of the generic type, in which good fuel purification at low weight is achieved. Another object of the invention is to provide a suction head for connection to the fuel line of a handheld work apparatus that achieves good fuel purification at low weight.

It is provided, to form the weight member, which is present anyway, at least partially as a magnet, An additional magnet that increases the weight of the work apparatus can he omitted as a result.

Preferably, the suction head comprises at least two weight members. In particular, at least two of the weight members of the suction head, more particularly all of the weight members of the suction head, are at least partially formed as magnets. Advantageously, at least one weight member, more preferably all of the weight members, are formed entirely as magnets.

The suction head has in particular a cover, on which an outlet port for fuel is advantageously formed. The magnet is advantageously arranged at an intermediate part which is arranged between the cover and the housing of the suction head. In this case, the cover holds the magnet in particular at the intermediate part, so that a simple construction is obtained. The magnet can be arranged in a simple manner at the intermediate part and fixed by the cover, so that, a simple assembly of the suction head results.

The intermediate part is advantageously connected to the housing via a first connection and to the cover via a second connection. Advantageously, the first connection comprises first, connecting means on the housing and second connecting means on the intermediate part, which interact when the intermediate part is arranged on the housing. The second connection advantageously comprises corresponding third connecting means on the intermediate part and fourth connecting means on the cover, which interact when the cover is arranged on the intermediate part. The first connecting means are advantageously formed such that they can be connected both to the second connecting means and to the fourth connecting means. This allows for the decision to be made during the production of the suction head as to whether an intermediate part having a magnet is to be arranged between the housing and the cover or not. The cover and the housing can be formed identically both for suction heads having a magnet and for suction heads without a magnet. This results in a simple construction, and only a few different components are required for the production of different suction heads.

Advantageously, the first connection and the second connection are formed as latching connections. The first and the second connections are advantageously detachable connections. A simple design is obtained if the connecting means are each formed by an annular latching bead. Advantageously, the first and third connecting means are formed as an inner annular latching bead, and the second and fourth connecting means are formed as an outer annular latching bead. In this case, the outer annular latching bead overlaps in each case the associated inner annular latching bead.

However, it is also possible to provide an inner annular latching bead on the cover and an outer annular latching bead on the housing.

Advantageously, the cover and the intermediate part are formed identically with regard to their functional surfaces on the side in each case facing the housing. Portions that are not functional may also be designed differently. Advantageously, the housing and the intermediate part are formed identically on the side in each case facing the cover, wherein here too, in each case the functional surfaces are formed identically. As a result, the intermediate part can undertake further functions undertaken by the cover of a suction head without a magnet and an intermediate part, such as the fixing of a filter element.

An advantageous arrangement can also he achieved in that, the magnet is arranged between the cover and a housing of the suction head. As a result, an additional intermediate part can be omitted. It can be provided for the weight member of the suction head to be formed entirely sis a magnet. In this case, the weight member may be formed, for example, in one piece and in the form of a rod. However, it may also be provided for a part of the weight member to be formed as a magnetic, rod-shaped element and for a second, likewise magnetic, part to be held in the intermediate part. It may be advantageous for the weight member to be arranged on, and more particularly integrated into the cover or the housing of the suction head. The magnet can then, for example, be clipped in, cast in or glued in.

Advantageously, the housing includes, opposite the cover, a bottom on which the weight member is fixed. The weight member is in this case formed in an elongate manner and extends from the bottom of the housing into the housing interior and is at least partially flowed around by fuel. A weight member is elongate when the extent parallel to the longitudinal center axis of the suction head is greater than the extension perpendicular to the longitudinal center axis. In particular, the weight, body is in the form of a rod. When the weight member is formed as a magnet, a good separation effect for metal shavings is achieved. A simple construction is obtained when the housing is made of plastic and the weight member is at least partially cast into the material of the housing. Advantageously, the housing is formed at least partially cylindricaily, wherein at the periphery of the housing at least one intake port for fuel is provided, which is covered by a screen.

BRIEF DESCRIPTION OF THE DRAWINGS

The invention will now be described with reference to the drawings wherein:

FIG. 4 is a perspective view of the suction head without the fuel line arranged thereon;

FIG. 5 is a longitudinal section through the suction head; and,

DESCRIPTION OF THE PREFERRED
EMBODIMENTS OF THE INVENTION

Figure 1:
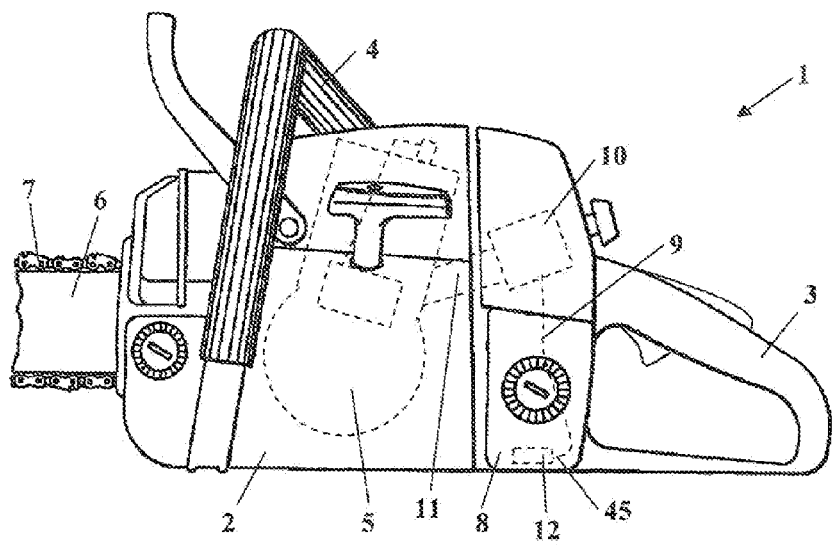
FIG. 1 is a schematic side view of a motor-driven chain saw.

FIG. 1 shows, as an exemplary embodiment of a handheld work apparatus, a motor-driven chain saw 1. The invention is particularly advantageous for portable, handheld work apparatuses that are moved and swivelled during operation, such as chain saws, hedge trimmers, cutoff machines, brushcutters, blowers and the like. The chain saw 1 has a housing 2 on which a rear handle 3 and a handle tube 4 are arranged. Within the housing 2 there is arranged an internal combustion engine 5, which propels a saw chain 7 around a guide bar 6. Inside the housing 2, a fuel tank 8 is integrated into which a fuel line 9 opens. The fuel line 9 is connected to a fuel supply device 10. A suction head 12 is fixed to the free end 45, projecting into the fuel tank 8, of the fuel line 9. The fuel line 9 can be formed in one piece between the fuel supply device 10 and the suction head 12 and be passed through the wall of the fuel tank 8. However, it is also possible to form the fuel line 9 from a plurality of segments, which may be connected together, for example, in the area of the wall of the fuel tank.

The fuel supply device 10 may be, for example, a carburetor. Metering of fuel can be achieved by the prevailing negative pressure in the intake port 11, or, in addition, via a valve, in particular an electromagnetic valve. However, it is also possible to supply the fuel directly via a fuel valve, for example into a crankcase or a transfer channel of internal combustion engine 5.

Figure 2:
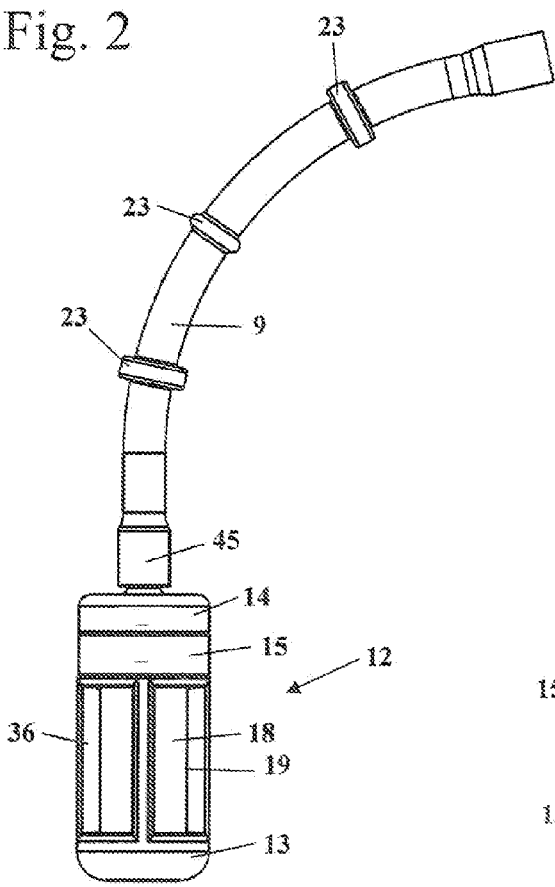
FIG. 2 is a side view of the suction head and the fuel line of the chain saw of FIG. 1.

As FIG. 2 shows, the fuel line 9 is curved and includes several thickenings 23, which may serve for stabilizing and for positioning. The fuel line 9 is made of flexible material, such as rubber or plastic. As depicted in FIG. 2, the suction head 12 comprises a housing 13, which is substantially cylindrical and includes several rectangular intake ports 19 that are separated by longitudinal struts 36. The intake ports 19 are each covered by a screen 18, which prevents coarse dirt from entering into the housing 13. Arranged on the housing 13 is an intermediate part 15. The intermediate part 15 is provided between the housing 13 and a cover 14 of the suction head 12. The free end 45 of the fuel line 9 is arranged on the cover 14.

Figure 3:
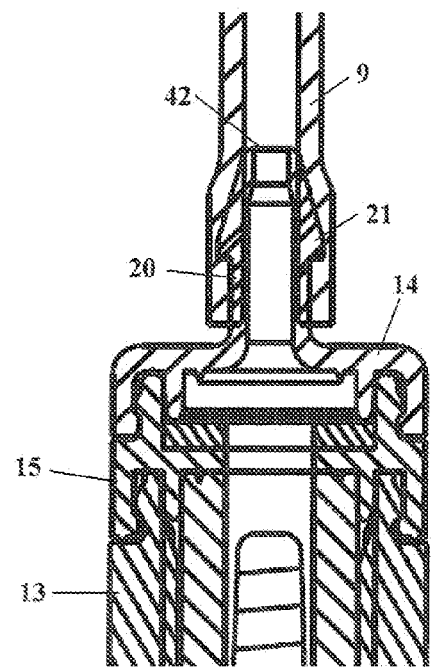
FIG. 3 is a cross section through the suction head of FIG. 2 in the area of the cover.

As FIG. 3 shows, the cover 14 includes, on the side opposite the housing 13, a connection nipple 20 with a circumferential rib 21, over which the fuel line 9 is pushed. Provided on the connection nipple 20 is an outlet port 42 for fuel, through which the fuel flows from the suction head 12 into the fuel line 9.

The connection nipple 20 having the rib 21 is also shown in FIG. 4. The rib 21 is formed on a cone which widens towards the cover 14, so that the fuel line 9 is pushed easily onto the connection nipple 20, but can be removed only with increased effort.

FIG. 5 shows the construction of the suction head 12 in detail. The housing 13 is formed cylindricaily around a longitudinal center axis 48 of the suction head 12 and is closed off on its end facing away from the cover 14 by a bottom 35. The screen 18 (FIG. 4) is cast into the longitudinal struts 36 of the housing 13. The housing 13 is made of plastic. In the interior of the housing 13, a first weight member 17 is disposed, which is made of a high density material, preferably of metal such as lead or the like. A weight member refers to an element, which is made of a material having a density that, is greater than the density of the housing. The weight member 17 is for instance rod-shaped and elongate and has a base 24 at which the weight member 17 widens. The base 24 is integrally cast into the material of the housing 13 at the bottom 35. At the bottom 35, an annular lower projection 37 protrudes into the housing 13, on which a cylindrical filter element 22 rests in a sealing manner. The weight member 17 protrudes into the interior of filter element 22. It can be provided for the longitudinal struts 36 to support the filter element 22 on its outer side. Between the screen 18 and the filter element 22 a gap is formed, which is substantially bridged by the longitudinal struts 36. In the exemplary embodiment, the first weight member 17 extends over a large part of the height, measured parallel to the longitudinal center axis 48, of the housing 13, but does not protrude into the intermediate part 15. The first weight member 17 may, however, also protrude into the intermediate part 15 or may extend through the intermediate part 15 up to the cover 14.

The housing 13 has, on its end facing the intermediate part 15, an inner latching periphery 26, over which an outer latching periphery 27 of the intermediate part 15 engages. The outer latching periphery 27 in this case engages by way of a thickening 50 into a circumferential groove 28 on the housing 13, and engages behind a thickening 49 on the inner latching periphery 26. The thickenings 49 and 50 are formed as circumferential, bead-shaped elevations. The inner latching periphery 26 and the outer latching periphery 27 constitute a first connection 25, which is formed as a latching connection.

As further shown in FIG. 5, the intermediate part 15 has, on the end thereof facing the filter element 22, an upper sealing flange 38, which is also circumferentially formed and which sealingly holds and positions the filter element 22 on its end facing the intermediate part 15. The intermediate part 15 has a central opening 43, which extends the opening formed in the interior of the filter element 22 and through which fuel can flow. The intermediate part 15 also has an annular flange 29, which protrudes into the gap formed between the housing 13 and the filter element 22 and thus positions the filter element 22 perpendicularly to the longitudinal center axis 48. The intermediate part 15 is disc-shaped, wherein the latching periphery 27 and 31, the annular flange 29 and the sealing flange 38 protrude away from the disc.

On that side of the cover 14 that faces the intermediate part 15, a receptacle 41 for a second weight member 16 is formed, which is in the form of a magnet. The second weight member 16 is disc-shaped and has a central opening 44, which is about the same size as the opening 43, so that the interior of the filter element 22 and the openings 43 and 44 form a continuous channel for fuel. On its side facing the cover 14, the intermediate part 15 has an inner latching periphery 31, over which an outer latching periphery 32 engages. The outer latching periphery 32 in this case engages by way of a thickening 52 into a groove 33 in the intermediate part 15, and thus fixes the cover 14 in a form-fitting manner to the intermediate part 15. Here, the thickening 52 engages behind a thickening 51 on the inner latching periphery 31, The inner latching periphery 31 forms with the outer latching periphery 32 a second connection 30, which is in the form of a latching connection and which is identical to the first latching connection 25. The inner latching periphery 31 of the intermediate part 15 is identical to the inner latching periphery 26 of the housing 13, and the outer latching periphery 32 of the cover 14 is identical to the outer latching periphery 27 of the intermediate part 15.

On the cover 14 an annular flange 34 facing into the interior of the suction head 12 is formed and engages into the inner latching periphery 31 of the intermediate part 15 and secures the second weight member 16 in the direction of the longitudinal center axis 48. The second weight member 16 is held in a form-fitting manner in the circumferential direction in the receptacle 41. On the cover 14, a sealing projection 39 is also formed, which is identical to the sealing projection 38 of the intermediate part 15. The sealing projection 39 on the cover 14 has no function in the suction head 12. The inner and outer latching peripheries (26, 27, 31, 32), the annular flanges (29, 34) and the annular sealing projections (38, 39) are functional surfaces, In the elements relevant to the function, that is, the functional surfaces, the intermediate part 15 is identical to the cover 14 on the side facing the housing 13 and identical to the housing 13 on the side facing the cover 14.

On account of the fact that the second, weight member, which is formed as a magnet, is held on the intermediate part 15, which is formed identically on the side facing the housing 13 to that side of the cover 14 that faces the housing 13 and is formed identically on the side facing the cover 14 to that side of the cover 14 that faces the housing 13, the cover 14 can also be fixed directly to the housing 13.

The intermediate part 15 having the second weight member 16 can also be omitted for work apparatuses in which no magnetic cleaning of the fuel is provided for or expedient. In order to arrange the second weight member 16, which is formed as a magnet, only the intermediate part 15 is required. The other elements of the suction head 12 may remain unchanged, in addition to the weight member 16, it can be provided for the weight member 17 also to be completely or partially formed as a magnet.

Figure 6:
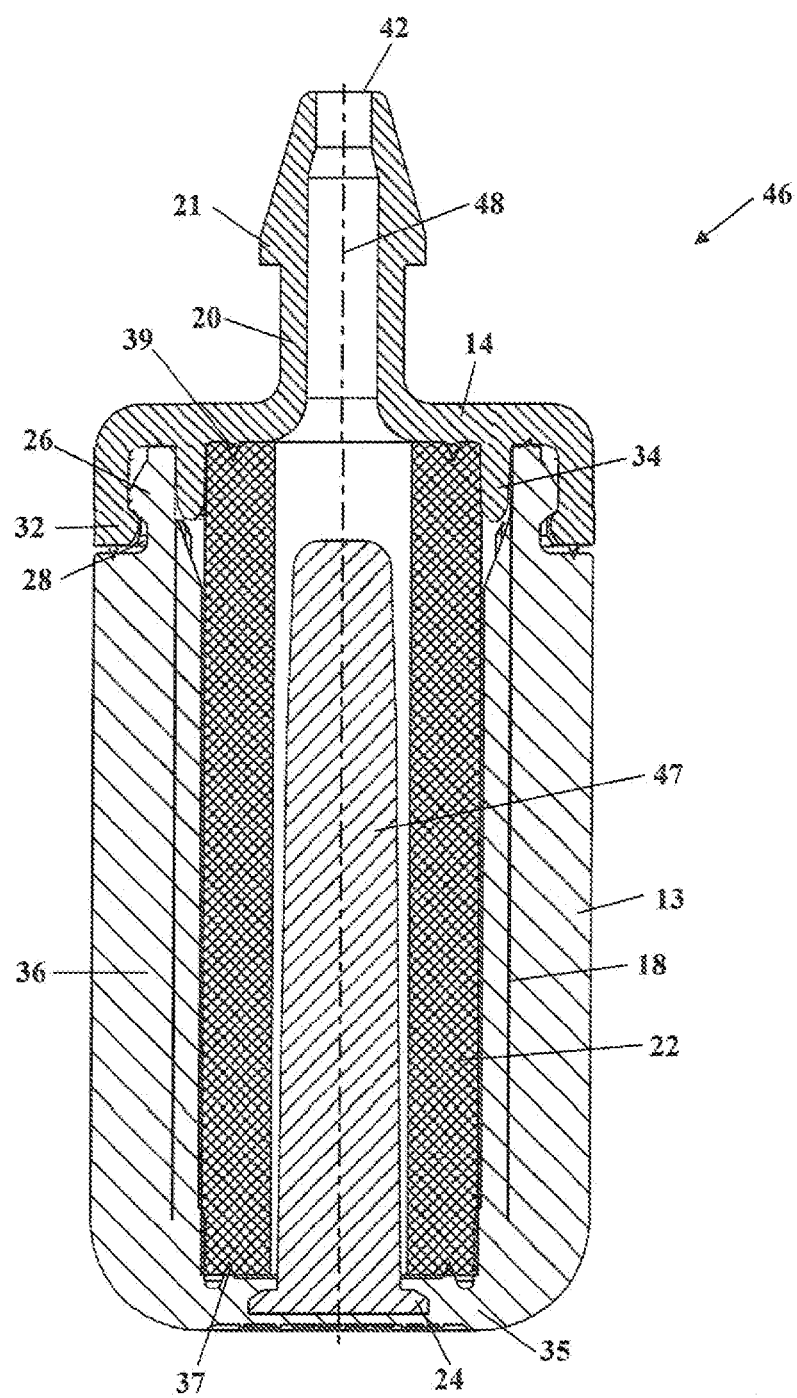
FIGS. 6 to 8 are longitudinal sections through exemplary embodiments of a suction head.

FIG. 6 shows an exemplary embodiment of a suction head 46, which has a cover 14 and a housing 13. The cover 14 is attached directly to the housing 13. The suction head 46 has a weight member 47, which is formed entirely as a magnet. The shape of the weight member 47 corresponds to the shape of the first weight, member 17. The other elements of the suction head 46, which have the same reference numerals as in FIGS. 2 to 5 also correspond to these elements. The cover 14 engages with its outer latching periphery 32 into the inner latching periphery 26 of the housing 13. The annular flange 34 protrudes into the gap between the filter element 22 and the housing 13 and fixes the filter element 22 perpendicularly to the longitudinal center axis 48. The sealing off of the filter element 22 at the cover 14 is achieved by the sealing projection 39 formed on the cover 14.

Figure 7:
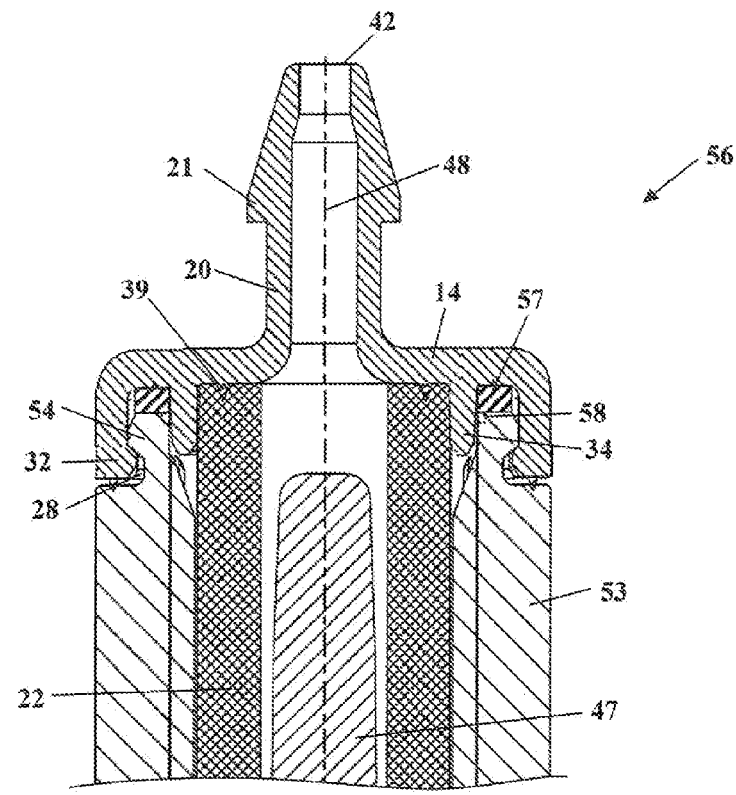

FIG. 7 shows a further exemplary embodiment of a suction head 56. The suction head 56 has a housing 53, which is closed off by a cover 14. Inside the housing 53 a weight member 47 is disposed, which corresponds to the weight member 47 depicted in FIG. 6. The housing 53 corresponds in its construction substantially to the housing 13 depicted in the preceding figures. In all of the figures, the same reference numerals correspond to like elements. The housing 53 has, in its region facing the cover 14, an inner latching periphery 54 which latches into the outer latching periphery 32 of the cover 14. At the front face of the latching periphery 54, a second weight member 57 is disposed, which is formed as an annular magnet. The second weight, member 57 is held, in particular clamped, between the cover 14 and the housing 53. The second, weight member 57 is disposed outside the annular flange 34. The filter element 22 extends within the annular flange 34 up to the cover 14. In addition to clamping, or as an alternative, the latching periphery 58 depicted by a dashed line in FIG. 7 may be provided, behind which the second weight member 57 is snapped in. As a result, the second weight member 57 is held on the cover 14.

In the exemplary embodiment of a suction head 66 shown in FIG. 3, a first weight member 47 and a second weight member 67 are provided. The suction head 66 has a housing 13, which corresponds to the housing 13 depicted in the preceding figures, and a cover 64, which is fixed to the housing 13 via a latching connection. Between the cover 64 and the filter element 22, the second weight member 67 is disposed adjacent to the front end of the filter element 22. The second weight member 67 has an annular sealing projection 69 with an approximately triangular cross section, which sealingly fixes the filter element.

The second weight, member 67 is disposed on the cover 64 within an annular flange 65. The annular flange 65 has a latching projection 68 which faces radially inwardly with respect to the longitudinal center axis 48, and behind which the second weight member 67 latches. The second weight member 67 is formed entirely as a magnet.

Figure 8:
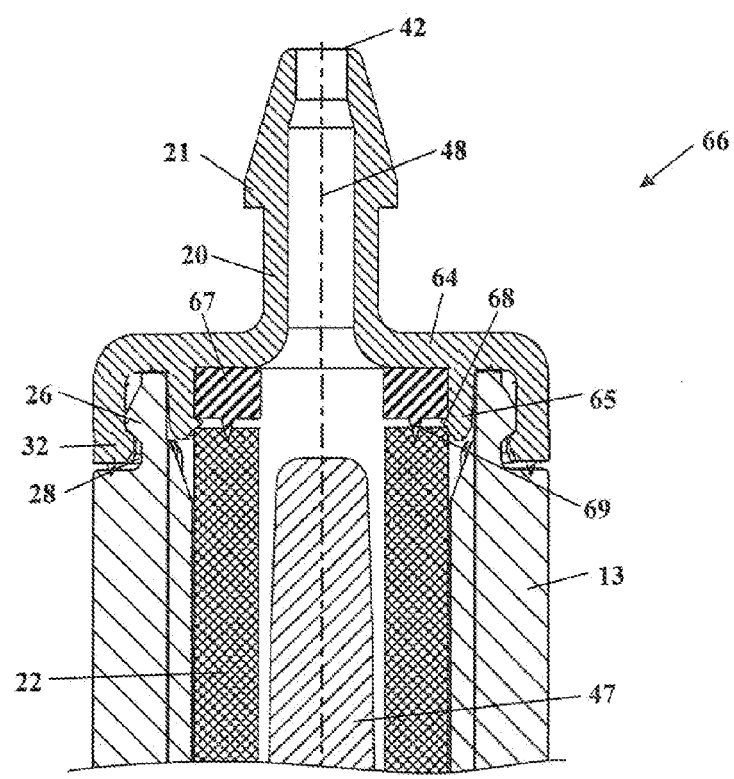

As a result of the arrangement depicted in FIGS. 7 and 8 of the second weight member (57, 67) between the cover (14, 64) and the housing (13, 53), an additional intermediate part 15 for fixing the magnet can be omitted. The weight member (57, 67) can also be cast into or glued to the cover (14, 64). The first weight member (17, 47) may be glued into, snapped into, or, as shown in the figures, be cast into the housing (13, 53). The first weight member (17, 47) may also extend up to the cover (14, 64) and be held by clamping between the housing (13, 53) and the cover (14, 64).

It is understood that the foregoing description is that of the preferred embodiments of the invention and that various changes and modifications may be made thereto without departing from the spirit and scope of the invention as defined in the appended claims.

What is claimed is:
1. A hand-guided work apparatus comprising:
an internal combustion engine;
a fuel-metering device for metering fuel to said engine;
a fuel tank for accommodating the fuel metered to said engine;
a flexible fuel line projecting into said fuel tank and having a free end;
a suction head arranged at said free end of said flexible fuel line and being connected to said fuel-metering device via said flexible fuel line;
said suction head including a cover;
said cover including an outlet port for fuel;
said suction head including a housing and an intermediate part arranged between said cover and said housing of said suction head;
said intermediate part being connected via a first connection to said housing and via a second connection to said cover;

the first connection including first connecting means on said housing and second connecting means on said intermediate part and the second connection including third connecting means on said intermediate part and fourth connecting means on said cover;

said suction head including at least one weight member configured at least partly as a magnet;

said magnet being arranged on said intermediate part; and, said first connecting means and said fourth connecting means being matched to each other so as to permit said intermediate part with said magnet to be removed and said first connecting means to be connected directly to said fourth connecting means.

2. The work apparatus of claim 1, wherein the suction head includes at least two weight members.

3. The work apparatus of claim 1, wherein at least one weight member is completely formed as a magnet.

4. The work apparatus of claim 1, wherein said cover holds said weight member on said intermediate part.

5. The work apparatus of aim claim 1, wherein said first connection and said second connection are snap-on connections.

6. The work apparatus of claim 1, wherein said cover and said intermediate part have respective sides facing toward said housing, said side of said cover and said side of said intermediate part each having a seal extension and an annular extension; said seal extension of said cover and said seal extension of said intermediate part have the same configuration; the annular extension of said cover and the annular extension of said intermediate part have the same configuration; said second connecting means and said fourth connecting means have like configurations; and, said first connecting means and said third connecting means have like configurations.

7. The work apparatus of claim 1, wherein said suction head has a housing; and, at least one weight member is attached to said housing of said suction head.

8. The work apparatus of claim 1, wherein said housing includes a base opposite said cover; and, said at least one weight member is elongated, extends from said base into the interior of said housing, and is at least partially immersed in fuel.

9. A suction head for connection to a fuel line in a handheld work apparatus, the suction head comprising:

said suction head including a cover;

said cover including an outlet port for fuel;

said suction head including a housing and an intermediate part arranged between said cover and said housing of said suction head;

the intermediate part being connected via a first connection to said housing and via a second connection to said cover;

the first connection including first connecting means on said housing and second connecting means on said intermediate part and the second connection including third connecting means on said intermediate part and fourth connecting means on said cover;

at least one weight member configured at least partly as a magnet;

said magnet being arranged on said intermediate part; and, said first connecting means and said fourth connecting means being matched to each other so as to permit said intermediate part with said magnet to be removed and said first connecting means to be connected directly to said fourth connecting means.

\* \* \* \* \*

UNITED STATES PATENT AND TRADEMARK OFFICE
CERTIFICATE OF CORRECTION

| | | |
|---|---|---|
| PATENT NO. | : 9,273,658 B2 | Page 1 of 1 |
| APPLICATION NO. | : 13/684404 | |
| DATED | : March 1, 2016 | |
| INVENTOR(S) | : Kinnen et al. | |

It is certified that error appears in the above-identified patent and that said Letters Patent is hereby corrected as shown below:

In the specification,

In column 1:
Line 23: delete "front" and substitute -- from -- therefor.

In column 2:
Line 42: delete "he" and substitute -- be -- therefor.
Line 46: delete "sis" and substitute -- as -- therefor.

In column 3:
Line 63: delete "12," and substitute -- 12. -- therefor.

In column 4:
Line 10: delete "cylindricaily" and substitute -- cylindrically -- therefor.

In column 5:
Line 7: delete "31," and substitute -- 31. -- therefor.
Line 27: delete "surfaces," and substitute -- surfaces. -- therefor.
Line 44: delete "unchanged, in" and substitute -- unchanged. In -- therefor.

In column 6:
Line 17: delete "FIG. 3" and substitute -- FIG. 8 -- therefor.
Line 27: delete "weight," and substitute -- weight -- therefor.

In column 7:
Line 19: delete "aim".

Signed and Sealed this
Seventh Day of June, 2016

Michelle K. Lee
*Director of the United States Patent and Trademark Office*